United States Patent [19]
Thorndyke

[11] Patent Number: 5,340,141
[45] Date of Patent: Aug. 23, 1994

[54] LIFT SYSTEMS FOR ELEVATING THE LOAD BED OF A VEHICLE

[76] Inventor: Robert J. Thorndyke, 846 Fernhill Boulevard, Oshawa, Ontario, Canada, L1J 5K4

[21] Appl. No.: 77,515

[22] Filed: Jun. 17, 1993

Related U.S. Application Data

[63] Continuation-in-part of Ser. No. 850,204, Mar. 12, 1992, abandoned, which is a continuation of Ser. No. 731,388, Jul. 17, 1991, abandoned, which is a continuation of Ser. No. 466,002, Jan. 16, 1990, abandoned.

[30] Foreign Application Priority Data

Jan. 5, 1990 [CA] Canada .................. 2007251

[51] Int. Cl.$^5$ ............................. B62D 27/02
[52] U.S. Cl. .................. 280/423.1; 280/81.1; 280/702
[58] Field of Search .......... 280/702, 414.5, 414.1, 280/423.1, 405.1, 81.1

[56] References Cited

U.S. PATENT DOCUMENTS

3,235,285  2/1966  Tenenbaum et al. ............ 280/423.1

FOREIGN PATENT DOCUMENTS

1088362  9/1960  Fed. Rep. of Germany ...... 280/702

Primary Examiner—Mitchell J. Hill
Attorney, Agent, or Firm—Shlesinger Arkwright & Garvey

[57] ABSTRACT

There is disclosed a vehicle having a load bed which has a back end that is supported by a wheel set which has a frame that is pivotally mounted below the back end and has extensible air bags connecting the frame to the back end of the load bed. The air bags are extensible to raise the back end to a raised position with respect to the frame and retractable to lower the back end to a lowered position. Included are non-compliant legs arranged to extend between the frame and the back end of the load bed when the back end of the load bed is in the raised position and a releasable locking operable to lock the legs in a locked position in which it serves to hold the back end of the load bed fast in the raised position. The lock is releasable to allow the load bed to be lowered to the lowered position. The air bags extend across the back end of the chassis to give high surface area contacts between the air bags and the frame of the load bed and wheel set frame. This high surface area results in a much lower air pressure being required to raise the load bed than is required in hydraulic systems where the cross sectional area of the piston is much smaller.

5 Claims, 4 Drawing Sheets

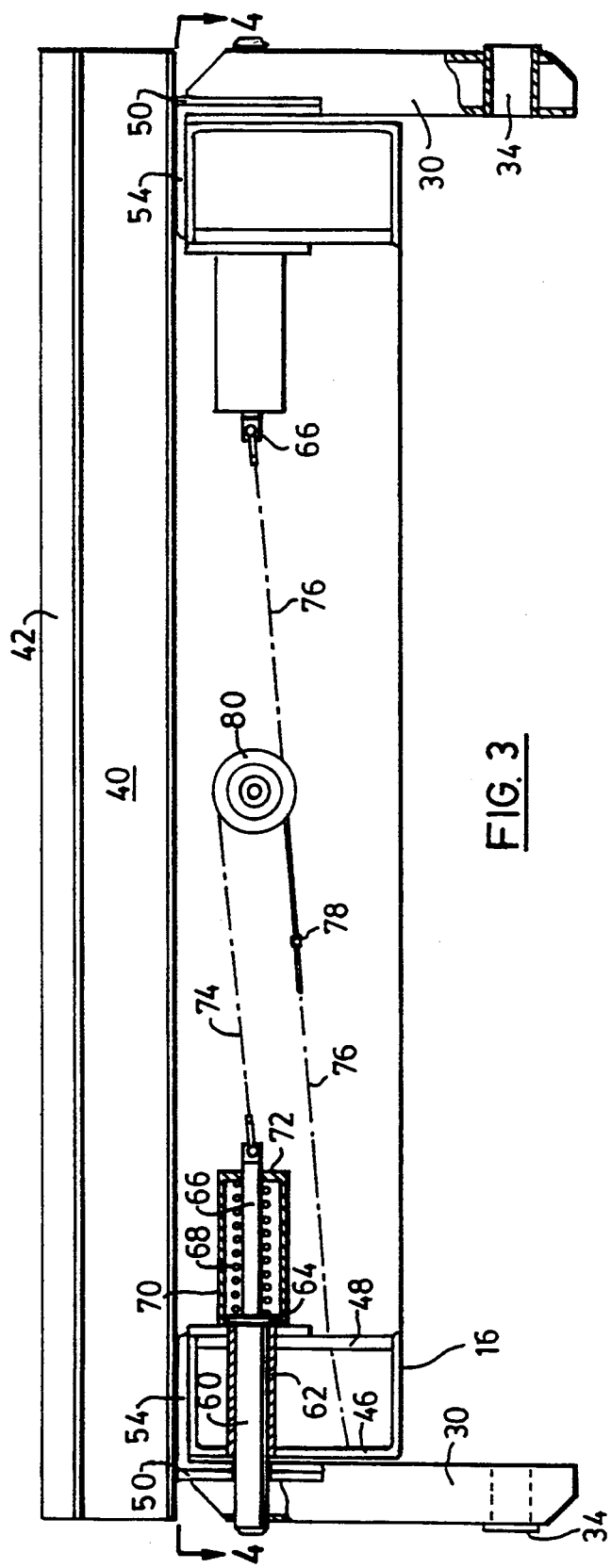
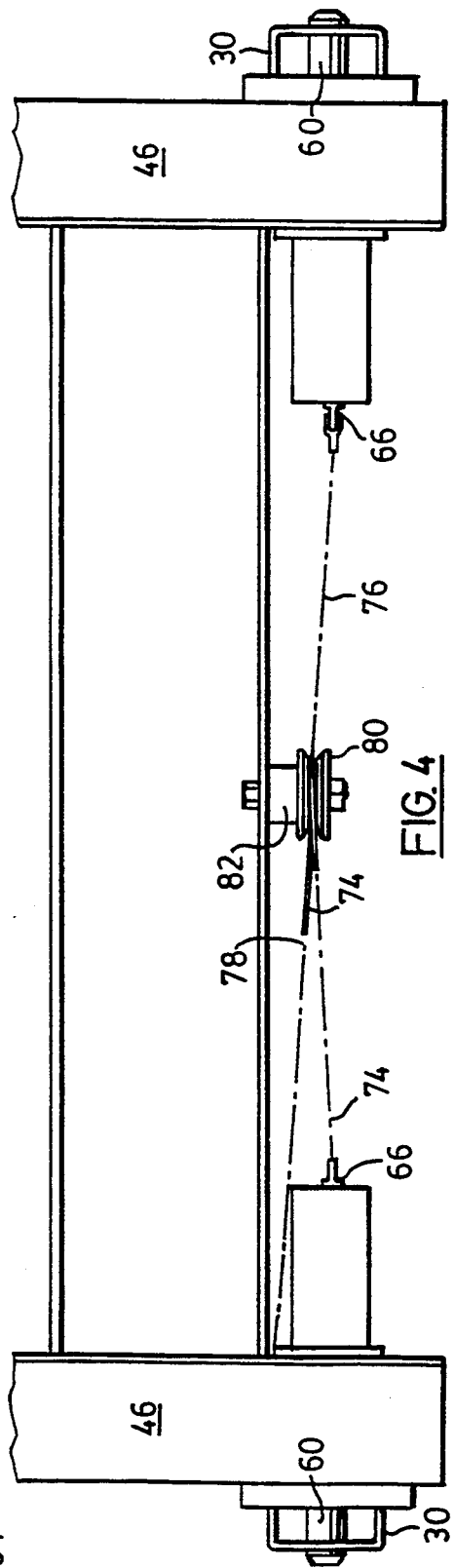
FIG. 3
FIG. 4

LIFT SYSTEMS FOR ELEVATING THE LOAD BED OF A VEHICLE

CROSS-REFERENCE TO RELATED APPLICATIONS

This application is a continuation-in-part of application No. 07/850,204 filed Mar. 12, 1992 now abandoned which is a continuation of application No. 07/731,388 filed Jul. 17, 1991, now abandoned, which is a continuation of application No. 07/466,002 filed Jan. 16, 1990 abandoned.

BACKGROUND OF INVENTION

This invention relates to vehicles which have a load bed which can be elevated at the back end thereof to align the load bed with a loading dock.

U.S. Pat. No. 4,568,094 and Re. 32,736 discloses an alignment system for vehicle load bed in which hydraulic jacks are provided for raising the back end of the load bed to achieve alignment with a loading dock. In this structure, the rear wheels of the vehicle are mounted on a support frame which is pivotally mounted on the body of the vehicle. Hydraulic jacks can be extended to raise the back end of the vehicle with respect to the frame of the wheel set. The hydraulic jacks also serve to retain the back end of the vehicle in the raised position.

Hydraulic jacking mechanisms by their nature tend to be very slow to operate. Generally, when high pressure systems of the type required in order to raise and lower the back end of a truck are supplied with hydraulic fluid, the supply is provided in a series of short injections; and as a result a considerable time is required in order to extend the hydraulic rams to a sufficient extent to raise the back end of a truck by 6 to 8 inches.

When a load is transferred from a loading dock into the back end of a van, it is common to use a fork lift truck in order to move the load items to and fro. Hydraulic rams and Jacks rely upon fluid type seals in order to remain in an extended position. Failure of the seals can result in a Ices of pressure in the hydraulic jacks and if such a failure occurs in the mechanism of Lovell, it can be extremely hazardous to drive a fork lift truck on to the elevated back end of the load bed. A failure is likely to occur in only one of the hydraulic rams and there may be sufficient power in the other ram to raise the load bed with the result that the failure would not be immediately obvious. If, however, a load is transferred On to the load bed, the load is likely to cause the load bed to tilt toward the side which is supported by the ram which has failed and this can destabilize the vehicle and the fork lift truck used for transporting the load on to the vehicle and can be very hazardous to the operator.

SUMMARY OF THE INVENTION

According to the present invention, there is provided a lift system for elevating a load bed of a vehicle, the load bed being mounted on a chassis which has a back end that is supported by a wheel set frame that is pivotally mounted at the front end thereof to the chassis, comprising (a) extensible air bag means disposed between the back end of the chassis and the frame, the extensible air bag means extending substantially across the back end of the frame and chassis, said extensible air bag means being connected to a source of air pressure for receiving air for extending to raise said chassis back end to a raised position with respect to the wheel set frame and being retractable to lower the chassis back end to a lowered position; and (b) non-compliant leg means securely mounted to the chassis and extending therefrom to a position adjacent said frame, and releasable locking means operably coupled to the frame, the locking means operable to lock the leg means and therefore the chassis with respect to the frame in a first locked position corresponding to said chassis being in the raised position, said locking means operable to lock the leg means and therefore the chassis with respect to the frame in a position corresponding to the chassis being in the lowered position.

According to another aspect of the present invention there is provided a vehicle comprising: a chassis having a load bed mounted thereon and which has a back end; a wheel set frame having a front end and a back end and at least one set of wheels mounted on and located at opposite sides of the frame in spaced relationship, the front end of the frame being pivotally mounted to the chassis; a source of air pressure; extensible air bag means mounted on the back end of the frame and located inwardly from the wheels, said air bag means being connected between the back end of the chassis and the frame, the extensible air bag means extending substantially across said chassis back end, said extensible air bag means being connected to said source of air pressure and being extensible to raise said chassis back end to a raised position with respect to the frame and retractable to lower the chassis back end to a lowered position, whereby expansion and contraction of the air bag means causes pivotal movement of the chassis with respect to the frame to raise and lower the back end of the chassis between a lowered and raised position; a pair of legs each having a proximal end mounted on the back end of the chassis and extending downwardly from opposite sides thereof; first and second passages formed in each leg and with said first passage above said second passage; a pair of locking pins slidably mounted on said frame for movement between an extending position in which the pins project from the frame a sufficient distance to extend into one or other of said passages and a second retracted position in which the pins are out of the path of movement of the leg; and pin displacement means mounted on the frame and operable to move the locking pins to and fro between the extended and retracted positions to be selectively located in the first or second passage of the legs to cooperate therewith to lock the back end of the chassis in the raised position or in the lowered position.

BRIEF DESCRIPTION OF THE DRAWINGS

FIG. 3 is a rear view of the locking mechanism which serves to lock the legs in position with respect to the frame of the vehicle taken along line 3—3 of FIG. 1.

FIG. 4 is a plan view taken along line 4—4 of the locking mechanism of FIG. 3.

DESCRIPTION OF THE PREFERRED EMBODIMENTS

Figure 1:
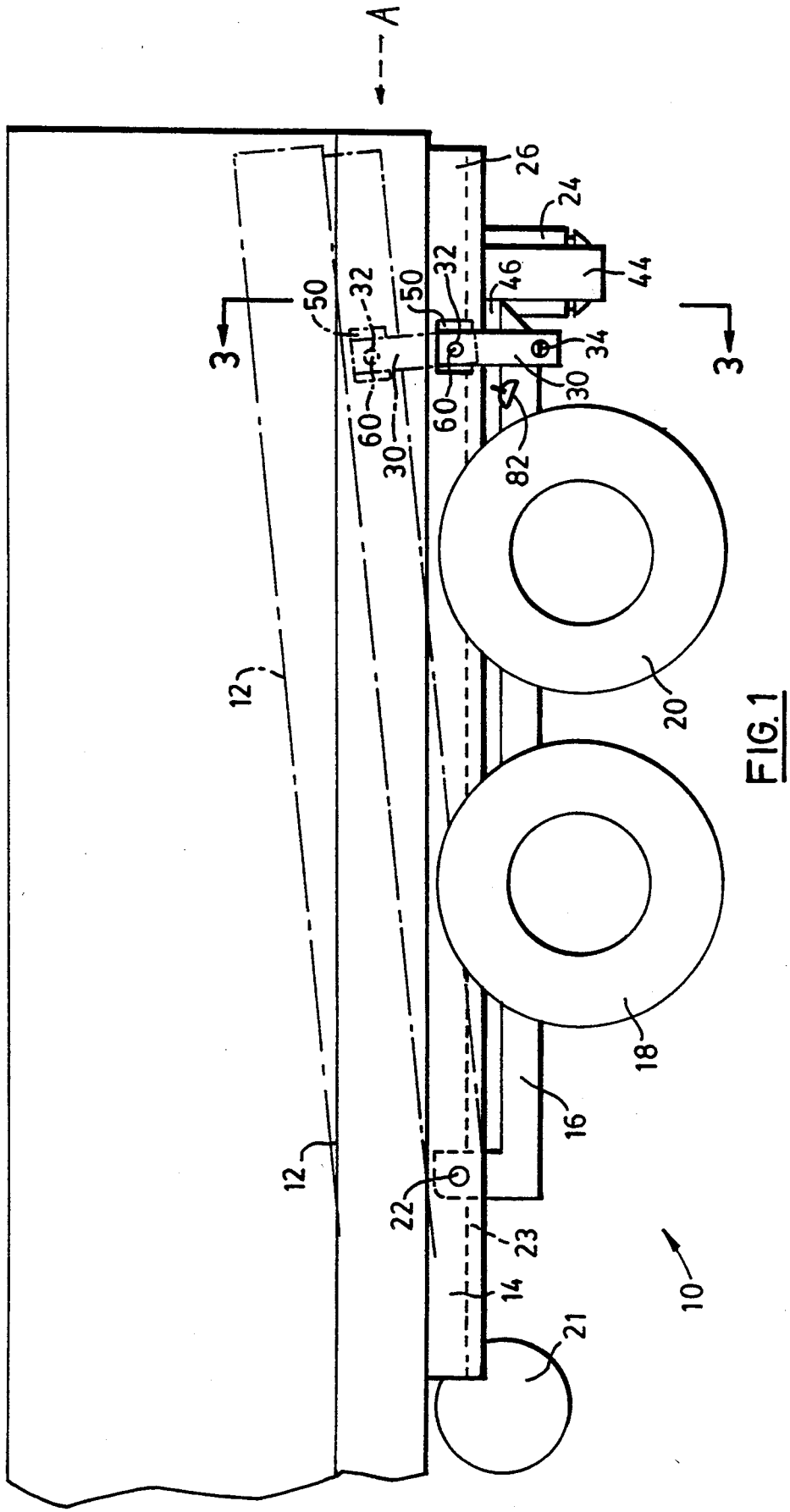
FIG. 1 is a side view of the back end of a motor vehicle incorporating the load bed raising and retaining mechanism of the present invention showing the load bed in the lowered position (solid lines) and in the raised position (broken lines).

With reference to FIG. 1 of the drawings, the reference numeral 10 refers generally to the back end of a motor vehicle. The motor vehicle has a load bed 12 supported by a chassis 14 on which a wheel set frame 16 is pivotally mounted. The wheel sets 18 and 20 are mounted on the frame 16 in a conventional manner. The frame 16 is pivotally mounted on the chassis 14 by means of pivot pins 22. Air bags 24 connect the back end 26 of the chassis to the frame 16 of the wheel set.

Legs 30 at the upper end thereof are secured to the back end 26 of the chassis 14. The legs 30 extend downwardly from the back end 26, one on either side of the wheel set frame 16. Each leg 30 has a first passage 32 opening through the upper end thereof and a second passage 34 opening through the lower end thereof such that passage 32 is above passage 34. As will be described hereinafter a pair of locking pins which are carried by the wheel set frame 16 through longitudinal beams 46 of the wheel set frame arranged to extend through the passages 32 to lock the wheel set frame with respect to the chassis when the load bed is in the lowered position and to extend through the passage 34 to lock the wheel set frame with respect to the chassis 14 when the chassis is in the raised position which is shown in broken lines in the FIG. 1.

Figure 2:
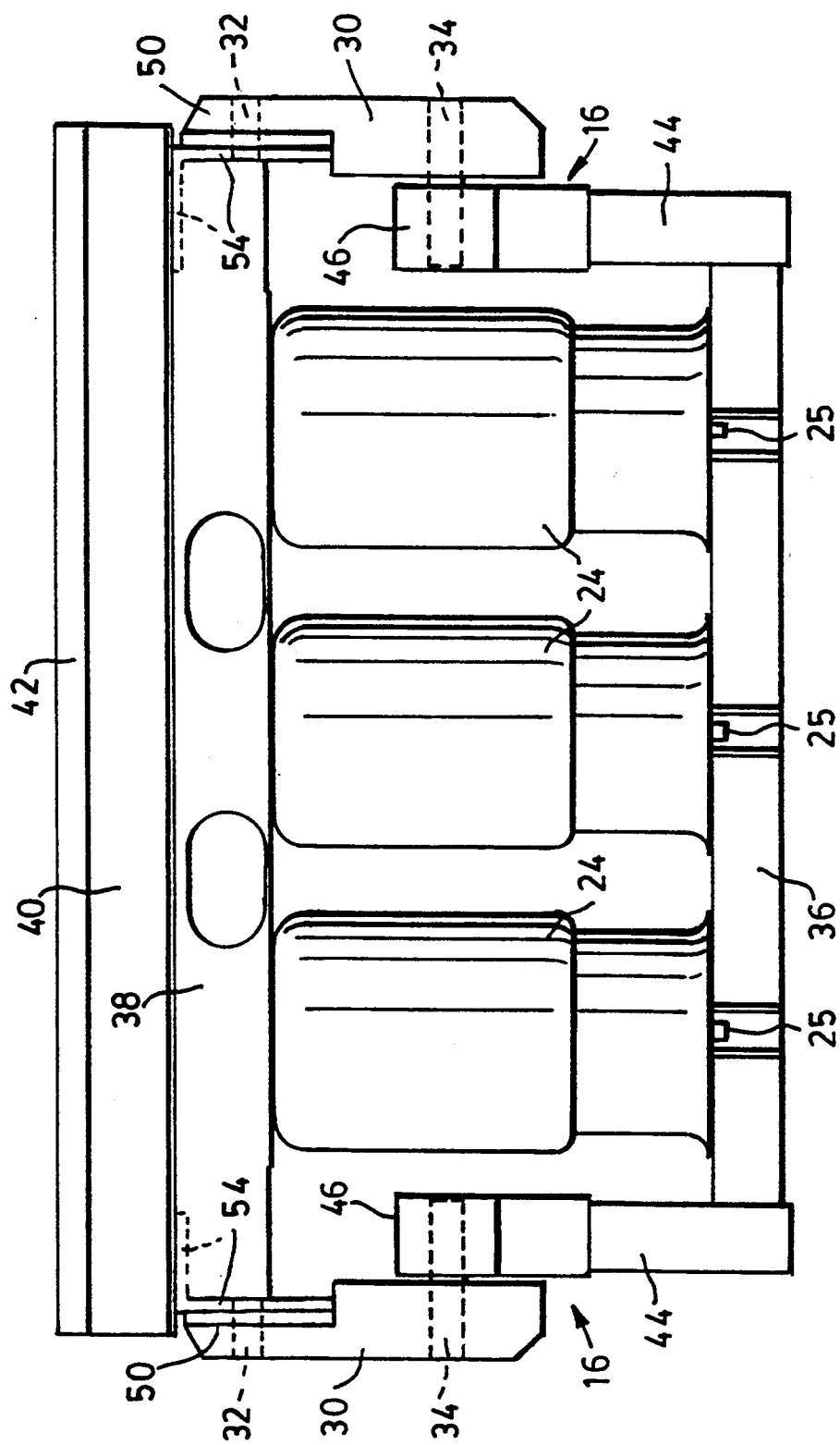
FIG. 2 is a view taken along arrow A of FIG. 1 of the truck showing the air bags in the extended position.

As shown in FIG. 2 of the drawings, air bags 24 have their lower end mounted to a transverse beam 36 and their upper end mounted to a transverse beam 38. The transverse beam 38 is secured to the underside of the transverse frame members 40 on which the floor boards 42 of the load bed 12 are mounted. The transverse beam 36 has legs 44 at opposite ends thereof which are attached to and depend from the longitudinal beams 46 of the wheel set frame 16. Air bags 24 extend substantially across the back end of the vehicle between the back end of the load bed chassis and the wheel set frame as is clearly illustrated in FIG. 2. This structure provides a high surface area contact between the back end of the chassis 14 and one end of the bags and the wheel set frame 16 at the other end of the air bags.

The air bags 24 are connected to the compressed air system used to operate the air brakes of the truck (illustrated in FIG. 1 as compressed air cylinder 21 and air line 23) or to any other source of compressed air carried by the truck. One or more vents 25 (FIG. 2) are provided to vent the airbags.

Figure 5:
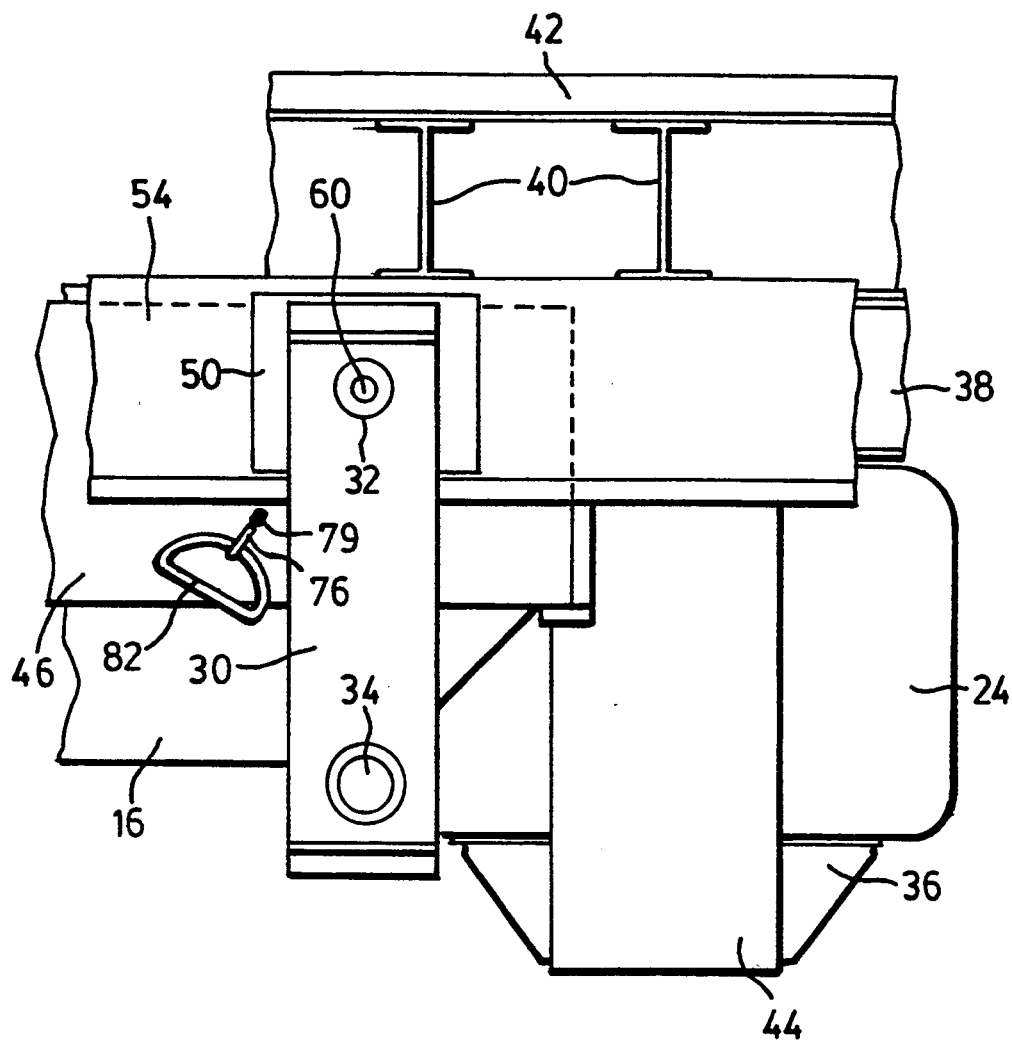
FIG. 5 is an enlarged detailed view of the back end of the truck showing the leg structure in enlarged detail.

AS shown in FIGS. 3 and 5 of the drawings, the legs 30 are secured to a face plate 50 which is, in turn, secured to an angle beam 54, the angle beam 54 is mounted on the underside of the transverse beams 40 which support the floor boards 42 as shown in FIG. 5.

As shown in FIGS. 3 and 4 of the drawings, locking pins 60 are slidably mounted in sleeves 62 which are supported by the longitudinal beams 46 of the wheel set frame 16. A face plate 48 is welded to the inner edges of the beam 46 and serves to support the inner end of the sleeve 62. The locking pin 60 has a collar 64 which projects radially outwardly therefrom and serves to bear against the inner end of the sleeve 62 to limit the outward movement of the locking pin 60. Locking pin 60 also has a portion 66 of reduced diameter at its inner end. A tubular housing 70 is secured to and projects radially from the face plate 48 and has an end wall 72 which is formed with a passage which slidably receives the portion 66 of reduced diameter. A compression spring 68 extends from the end wall 72 to the collar 64 and serves to normally urge the locking pin 60 to its extended position shown in FIG. 3. Flexible cables 74 and 76 are connected to the ends of the reduced portion 66. The cable 74 extends around the sheave 80 and the cable 76 passes under the sheave 80. The cable 74 is attached to the cable 76 by means of a collar 78 which is crimped to form a secure connection. The cable 76 extends through the face plate 48 and the beam 46. A passage 79 (FIG. 5) is formed on the beam 46 through which the cable 76 emerges. A D-shaped handle 82 is attached to the outer end of the cable 76. By pulling the handle 82 it is possible to manually withdraw the locking pins 60 so that they are drawn inwardly from the position shown in FIG. 3 so as to be fully withdrawn from the passages 32 formed in the legs 30. This technique is also used for withdrawing the pins 60 from the passages 34 when chassis 14 is locked in the raised position.

In use when the vehicle is normally driven on the highway, it will be driven with the back end of the load bed 12 in the lowered position shown in FIG. 1. In this position, the locking pins 60 project through the passages 32 in the legs 30 and serve to lock the wheel set frame 16 with respect to the chassis 14 so that the wheel set frame 16 cannot pivot about the pivot pins 22. When the back end of the load bed is to be raised, the operator pulls the handle 82 to manually withdraw the locking pins 60, and after the pins 60 are withdrawn, air is supplied to the air bags 24 by activating an air control valve (not shown) which is located in close proximity to the handle 82. As a result, the air bags 24 will begin to expand an will serve to raise the back end of the load bed to the elevated position. As soon as the back end has been raised a short distance, it is possible to release the handle 82 because the locking pins 60 will no longer be aligned with the passages 32. The back end of the truck will continue to be raised by the air bags 24 until the locking pins 60 are aligned with the passages 34. It will be noted that the passages 34 are of a larger diameter than the passages 32. This serves to facilitate the alignment of the locking pins 60 with the passage 34 and takes into account the angular displacement of the legs 30 resulting from the movement of the chassis 14 about the pivot pin 22. The compression springs 68 normally urge the locking pins 60 to their extended position and consequently, when the locking pins 60 are aligned with the passages 34, they will be automatically driven to their extended position to extend through the passages 34. When the locking pins 60 extend through the passages 34, they will serve to provide a positive lock which will prevent both raising and lowering of the load bed with respect to the wheel set frame. The legs 30 will form non-compliant support structures which will support the load bed in an elevated position even when the air pressure is removed from the air bags. The legs 30 will continue to function as non-compliant support legs until the locking pins 60 are withdrawn and the air pressure in the air bags 24 is vented to permit the back end of the vehicle to return to its lowered position, at which time the locking pins 60 will reenter the passages 32 and serve to lock the load bed in the lowered position.

From the foregoing, it will be apparent that the present invention provides a simple and an inexpensive mechanism which provides for the rapid raising and lowering of the back end of the vehicle in order to achieve the required alignment while ensuring that when the back end of the load bed is in the elevated position, it can be retained in the elevated position by a non-compliant structure which provides a mechanical interlock which will not fail in the event of a failure of the elevating mechanism.

The air bag lift system of the present invention is advantageous over known hydraulic systems because the time for full expansion of the bags to lift the back end of the chassis and load bed to the maximum height is about 10-12 seconds at an air pressure of about 100 psi. This contrasts with known hydraulic ram structures which need pressures of about 2000 psi and about 8-10 minutes in order to achieve the required elevation. Without the use of the non-compliant leg structure of the present invention, however, the air bags would be very ineffective in attempting to retain the load bed stable in the elevated position because the bags are compliant and would deflect considerably under the influence of an increased load.

The reason the present air bag system provides a rapid rise with such a low air pressure compared to hydraulic ram systems is related to the high surface area contact between the air bags and the load bed chassis at one end of the bag(s) and the vehicle frame at the other end of the bag(s). This is achieved in part because of the size of the bags and because the extensible air bags extend across the width of the chassis and frame at the back end, see FIG. 2. Based on the formula relating force (F), pressure (P) and area (A); $F = P \cdot A$; it may be seen that for a higher area, a lower pressure is required to generate a given force than that required to generate the same force across a smaller area. Thus, in systems using hydraulic rams and the like the area across which the lift force is generated is the cross sectional area of the piston while in the present system it is the cross sectional area of the ends of the air bags contacting the vehicle frame and frame of the load bed. In other words, the surface area contact of the present air bag system being orders of magnitude greater than conventional ram systems results in a commensurate reduction of air pressure over conventional ram systems.

These and other advantages of the mechanism of the present invention will be apparent to those skilled in the art.

What is claimed is:

1. A lift system for elevating a load bed of a vehicle, the load bed being mounted on a chassis which has a back end that is supported by a wheel set frame that is pivotally mounted at the front end thereof to the chassis, comprising;
   (a) extensible air bag means disposed between the back end of the chassis and the frame, the extensible air bag means extending substantially across the back end of the frame and chassis, said extensible air bag means being connected to a source of air pressure for receiving air for extending to raise said chassis back end to a raised position with respect to the wheel set frame and being retractable to lower the chassis back end to a lowered position; and
   (b) non-compliant leg means securely mounted to the chassis and extending therefrom to a position adjacent said frame, and releasable locking means operably coupled to the frame, the locking means operable to lock the leg means and therefore the chassis with respect to the frame in a first locked position corresponding to said chassis being in the raised position, said locking means operable to lock the leg means and therefore the chassis with respect to the frame in a position corresponding to the chassis being in the lowered position.

2. A lift system according to claim 1 wherein said flexible air bag means comprises a plurality of air bags disposed adjacent each other across the back end of the chassis.

3. A lift system as claimed in claim 1 in which a source of air pressure is carried by the vehicle, wherein the inflatable air bag means communicates with said source of pneumatic pressure.

4. A vehicle as claimed in claim 1 further comprising manually operable release means for releasing said locking means.

5. A vehicle comprising:
   a) a chassis having a load bed mounted thereon and which has a back end;
   b) a wheel set frame having a front end and a back end and at least one set of wheels mounted on and located at opposite sides of the frame in spaced relationship, the front end of the frame being pivotally mounted to the chassis;
   c) a source of air pressure;
   d) extensible air bag means mounted on the back end of the frame and located inwardly from the wheels, said air bag means being connected between the back end of the chassis and the frame, the extensible air bag means extending substantially across said chassis back end, said extensible air bag means being connected to said source of air pressure and being extensible to raise said chassis back end to a raised position with respect to the frame and retractable to lower the chassis back end to a lowered position, whereby expansion and contraction of the air bag means causes pivotal movement of the chassis with respect to the frame to raise and lower the back end of the chassis between a lowered and raised position;
   e) a pair of legs each having a proximal end mounted on the back end of the chassis and extending downwardly from opposite sides thereof;
   f) first and second passages formed in each leg and arranged with said first passage above said second passage;
   g) a pair of locking pins slidably mounted on said frame for movement between an extending position in which the pins project from the frame a sufficient distance to extend into one or other of said passages and a second retracted position in which the pins are out of the path of movement of the leg; and
   h) pin displacement means mounted on the frame and operable to move the locking pins to and fro between the extended and retracted positions to be selectively located in the first or second passage of the legs to cooperate therewith to lock the back end of the chassis in the raised position or in the lowered position.

* * * * *